United States Patent
Matsumoto

(10) Patent No.: US 10,108,174 B2
(45) Date of Patent: Oct. 23, 2018

(54) NUMERICAL CONTROLLER CONTROLLING A LASER PROCESSING MACHINE

(71) Applicant: FANUC Corporation, Minamitsuru-gun, Yamanashi (JP)

(72) Inventor: Takayoshi Matsumoto, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 330 days.

(21) Appl. No.: 14/629,524

(22) Filed: Feb. 24, 2015

(65) Prior Publication Data

US 2015/0241868 A1   Aug. 27, 2015

(30) Foreign Application Priority Data

Feb. 25, 2014   (JP) .................................. 2014-034323

(51) Int. Cl.
*G05B 19/402* (2006.01)
*B23K 26/08* (2014.01)
(Continued)

(52) U.S. Cl.
CPC ............ *G05B 19/402* (2013.01); *B23K 26/03* (2013.01); *B23K 26/048* (2013.01);
(Continued)

(58) Field of Classification Search
CPC ........ G05B 19/402; G05B 2219/45041; G05B 2219/50131; B23K 26/03; B23K 26/048;
(Continued)

(56) References Cited

U.S. PATENT DOCUMENTS 5,491,318 A    2/1996  Sugawara et al.
7,012,210 B2   3/2006  Kibbler et al.
(Continued)

FOREIGN PATENT DOCUMENTS

DE          4400198 C2      7/1997
JP       2003-236691 A      8/2003
(Continued)

OTHER PUBLICATIONS

Machine translation of JP 2003-236691, Mitsuyoshi Hironobu, Thermal cutting machine and thermal cutting method, Aug. 26, 2003, 12 pages.*

(Continued)

*Primary Examiner* — Thomas C Lee
*Assistant Examiner* — Tri T Nguyen
(74) *Attorney, Agent, or Firm* — Drinker Biddle & Reath LLP

(57) ABSTRACT

The gap control axis following speed calculating unit of a numerical controller controlling a laser processing machine calculates a gap control axis following speed based on a displacement amount obtained from a separation distance and a reference distance between a nozzle tip and a workpiece, and a gap control gain. A first determining unit determines that the nozzle tip has entered an approach side when the separation distance becomes smaller than the reference distance. A first changing unit changes the gap control gain continuously in accordance with the displacement amount.

2 Claims, 7 Drawing Sheets

(51) Int. Cl.
*B23K 26/03* (2006.01)
*B23K 26/04* (2014.01)
*B23K 26/38* (2014.01)

(52) U.S. Cl.
CPC ...... *B23K 26/0876* (2013.01); *B23K 26/0892* (2013.01); *B23K 26/38* (2013.01); *G05B 2219/45041* (2013.01); *G05B 2219/50131* (2013.01)

(58) Field of Classification Search
CPC . B23K 26/0876; B23K 26/0892; B23K 26/38
See application file for complete search history.

(56) References Cited

U.S. PATENT DOCUMENTS

| | | | | |
|---|---|---|---|---|
| 2003/0183608 | A1* | 10/2003 | Yamazaki | B23K 26/0853 219/121.83 |
| 2004/0128026 | A1* | 7/2004 | Harris | B25J 9/1689 700/245 |
| 2006/0081575 | A1* | 4/2006 | Egawa | B23K 26/04 219/121.84 |
| 2013/0103183 | A1 | 4/2013 | Mochida | |
| 2013/0222926 | A1* | 8/2013 | Kawada | G03B 3/10 359/696 |

FOREIGN PATENT DOCUMENTS

| | | |
|---|---|---|
| JP | 2004-034051 A | 2/2004 |
| JP | 2005-135061 A | 5/2005 |
| JP | 2006-110592 A | 4/2006 |
| JP | 2011-235309 A | 11/2011 |
| JP | 2013-086115 A | 5/2013 |
| JP | 2013-086172 A | 5/2013 |

OTHER PUBLICATIONS

Machine translation of JP2006-122928, Nakagawa Takayuki et al., Laser Beam Machining Apparatus, May 18, 2006; 12 pages.*
The Notification of the First Office Action dated Nov. 22, 2016 in Chinese Patent Application No. 2015100878576 (6 pages) with an English Translation (9 pages).
Notification of Reasons for Refusal dated Jul. 21, 2015 in Japanese Patent Application No. 2014-034323 (2 pages) with an English Translation (2 pages).
Office Action dated May 18, 2017 in German Patent Application No. 10 2015 002 040.4 (6 pages) with an English translation (5 pages).

* cited by examiner

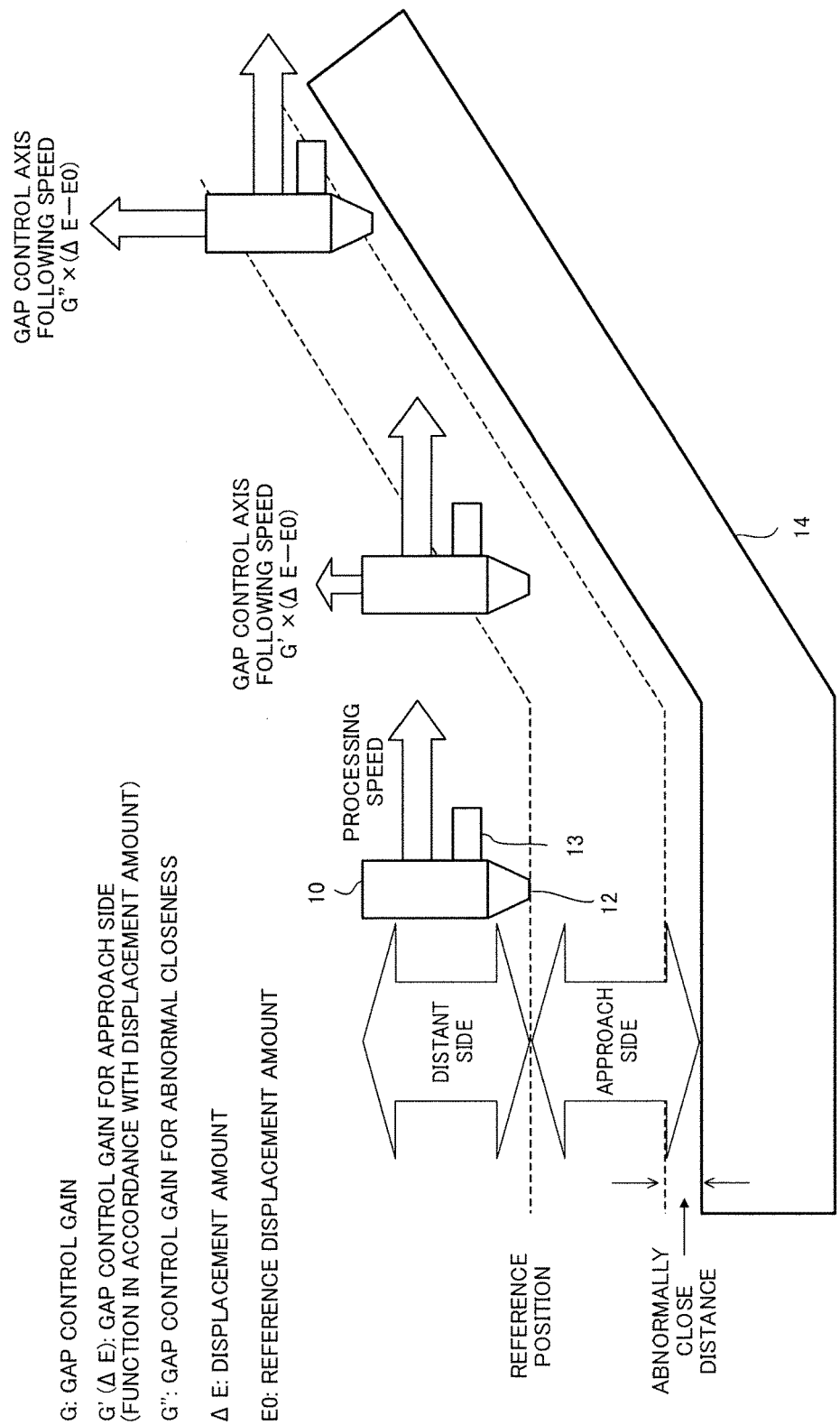

A  RELATION BETWEEN DISPLACEMENT AMOUNT AND GAIN

B  RELATION BETWEEN DISPLACEMENT AMOUNT AND GAP CONTROL FOLLOWING SPEED

C  RELATION BETWEEN DISPLACEMENT AMOUNT AND ELEVATION ANGLE

D  RELATION BETWEEN WORKPIECE AND ELEVATION ANGLE

NUMERICAL CONTROLLER CONTROLLING A LASER PROCESSING MACHINE

RELATED APPLICATION DATA

This application claims priority under 35 U.S.C. § 119 and/or § 365 to Japanese Application No. 2014-034323 filed Feb. 25, 2014, the entire contents is incorporated herein by reference.

BACKGROUND OF THE INVENTION

1. Field of the Invention

The present invention relates to a numerical controller controlling a laser processing machine.

2. Description of the Related Art

FIG. 5 is a diagram explaining a conventional laser processing machine. Gap control in a laser processing machine is performed in a manner that a gap sensor 13 for detecting the distance between a workpiece 14 and a nozzle tip 12 is attached to a laser processing head 10 and a signal of this sensor is input to a numerical controller (not illustrated), whereby the numerical controller outputs a move command to a gap control axis such that the distance between the nozzle tip and the workpiece is maintained constant (at a set value). With this function, even if the workpiece has a bend caused by a "deflection" or a "curve", the gap control axis is automatically controlled so that the relative positions of the nozzle tip (beam focus) and the workpiece do not change, whereby stable laser processing is achieved.

Japan Patent Application Laid-Open No. 2003-236691 discloses a technique including a gap sensor that detects an actual gap value between a nozzle and a workpiece in a Z-axis direction and a controller that controls a Z-axis motor and an orthogonal axis motor. With the technique, the gain of the controller when a thermal cutting head is retreated in an upward direction in an idle moving process, in which the head is transferred at an idle moving speed faster than the cutting speed, is increased to be higher than the normal gain of the controller in a thermal cutting process, in which a thermal cutting beam is irradiated from the nozzle.

FIG. 6 is a diagram explaining a problem with a conventional laser processing method. When the nozzle tip 12 approaches abnormally close to the workpiece 14 during processing of a part of the workpiece 14 where a bend caused by a "deflection" or a "curve" is present, the gap control axis is elevated under the gap control so that the distance between the nozzle tip 12 and the workpiece 14 is maintained constant. However, when a processing speed is faster than a gap control axis following speed, the nozzle tip 12 collides with the workpiece 14 due to horizontal movement thereof before the distance between the nozzle tip 12 and the workpiece 14 is maintained constant. More specifically, when a processing speed is faster than a gap control axis following speed with which the distance between the nozzle tip 12 and the workpiece 14 is maintained at a predetermined value, the nozzle tip 12 may approach abnormally close to the workpiece 14 in a part of the workpiece 14 where a bend caused by a "deflection" or a "curve" is present, so that the nozzle tip 12 interferes (collides) with the workpiece 14 before the distance between the nozzle tip 12 and the workpiece 14 becomes a predetermined value. It should be noted that E0 is a reference displacement amount.

When the interference is avoided by setting the gap control axis following speed faster, the gap control gain needs to be preset high. However, the gain is adjusted and set such that the axis is stably operated without oscillation, and thus cannot be preset high.

SUMMARY OF THE INVENTION

The present invention addresses the problems of the above prior art with the object of providing a numerical controller controlling a laser processing machine capable of performing control in a manner avoiding interference between a workpiece and a nozzle tip by increasing the gap control gain when the nozzle tip approaches close to the workpiece during laser processing using gap control.

In laser processing in which a processing speed is faster than a gap control axis following speed under the gap control, when the nozzle tip approaches close to the workpiece, the gap control gain is temporarily increased so that the gap control axis following speed is temporarily increased, whereby interference between the workpiece and the nozzle tip can be avoided.

A numerical controller of a laser processing machine according to the present invention includes a reference distance specifying unit, a gap amount detecting unit, a displacement amount calculating unit, a data storing unit, a gap control axis following speed calculating unit, a first determining unit, and a first changing unit. The reference distance specifying unit specifies a reference separation distance between a nozzle tip and a workpiece as a reference distance. The gap amount detecting unit detects the separation distance between the nozzle tip and the workpiece. The displacement amount calculating unit obtains a displacement amount from the reference distance specified by the reference distance specifying unit and the separation distance detected by the gap amount detecting unit. The data storing unit is configured to store a gap control gain. The gap control axis following speed calculating unit calculates a gap control axis following speed from the displacement amount and the gap control gain. The first determining unit determines that the nozzle tip has entered an approach side when the separation distance between the nozzle tip and the workpiece becomes smaller than the reference distance. The first changing unit changes the gap control gain continuously in accordance with the displacement amount when the first determining unit determines that the nozzle tip has entered the approach side. The numerical controller of a laser processing machine performs control of the nozzle tip position of the laser processing machine based on the displacement amount.

The numerical controller controlling the laser processing machine may further include a second determining unit and a second changing unit. The second determining unit determines that emergent abnormal closeness is present when the separation distance between the nozzle tip and the workpiece becomes smaller than an abnormally close distance. The second changing unit changes a gain using a function that is continuous at the approach side closer to the workpiece than the reference position to a gap control gain for emergency after the second determining unit determines that the emergent abnormal closeness is present.

The first determining unit may determine that the nozzle tip has returned from the approach side to the reference position, and the numerical controller of a laser processing machine may include a switching unit that switches to a normal gap control gain when the first determining unit determines that the nozzle tip has returned to the reference position.

The gap control gain for the approach side may be a function that is any one of an N-order function (N is a natural number), a trigonometric function, an exponential function, and a logarithmic function and is continuous at the approach side from the reference position.

With the configuration described above, the present invention can provide a numerical controller controlling a laser processing machine capable of performing control in a manner avoiding interference between a workpiece and a nozzle tip by increasing the gap control gain when the nozzle tip approaches close to the workpiece during laser processing using gap control.

BRIEF DESCRIPTION OF THE DRAWINGS

These and other objects and features of the present invention will become apparent from the following description of exemplary embodiments with reference to the accompanying drawings in which:

FIG. 1 is a diagram explaining a control method according to one embodiment of the present invention;

DETAILED DESCRIPTION OF THE PREFERRED EMBODIMENTS

Figure 2A:
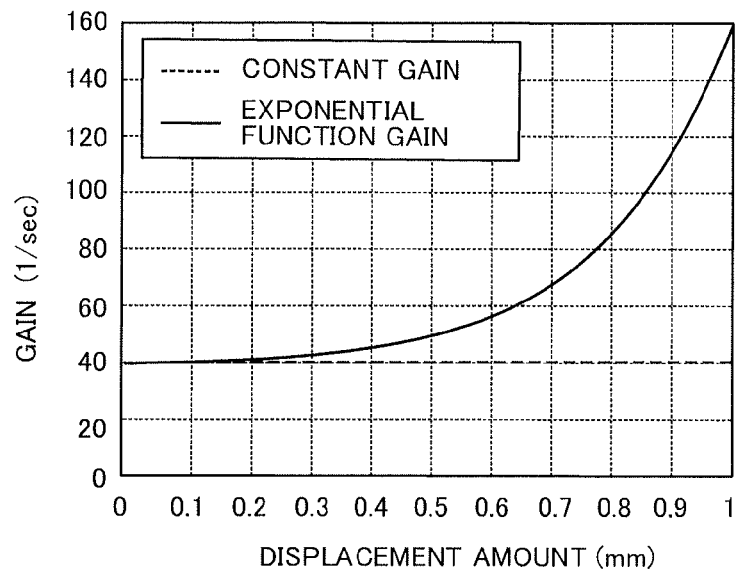
FIGS. 2A to 2D are diagrams explaining Embodiment 1 according to the present invention.
Figure 2B:
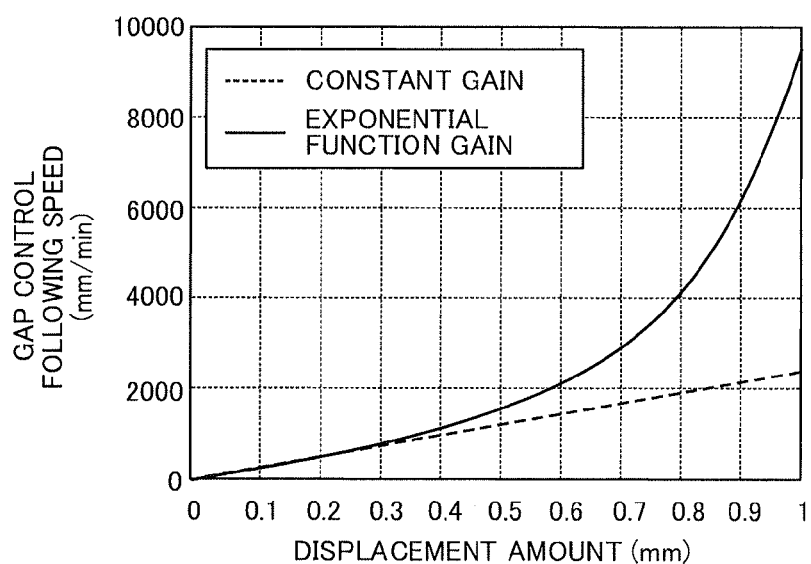

FIG. 1 is a diagram explaining a control method according to one embodiment of the present invention. A general laser processing machine includes a Z-axis moving motor, an X-axis moving motor, a Y-axis moving motor, and a controller in addition to a laser processing head 10 irradiating a laser beam to a plate-shaped workpiece 14. The Z-axis moving motor moves this laser processing head 10 in the vertical direction (Z-axis direction). The X-axis moving motor and the Y-axis moving motor move the laser processing head 10 relatively to the workpiece 14 in the X-axis direction and the Y-axis direction respectively, which are orthogonal to the Z-axis direction. The controller controls the three moving motors (the Z-axis moving motor, the X-axis moving motor, and the Y-axis moving motor). To maintain a gap value between a nozzle and the workpiece 14 substantially constant with the laser processing head 10 to perform stable laser processing, the laser processing machine described above further includes a gap sensor 13 that detects an actual gap amount between the nozzle and the workpiece 14. The controller is configured to output a Z-axis command value based on a detected value of the gap sensor 13 and the target gap value described above to the Z-axis moving motor.

The controller described above causes the nozzle to irradiate a laser beam to the workpiece 14 while controlling the X-axis moving motor and the Y-axis moving motor to move the laser processing head 10 relatively to the workpiece 14 in the X-axis direction and the Y-axis direction at a cutting speed. Furthermore, the gap sensor 13 detects an actual gap value between the nozzle and the workpiece 14, and the controller outputs a Z-axis command value based on the detected value of the gap sensor 13 and the target gap value to the Z-axis moving motor to cause the laser processing head to move in the Z-axis direction. With this, the gap value between the nozzle and the workpiece 14 is maintained substantially constant, whereby stable laser cutting processing can be performed on a unit of the workpiece 14 that is to be processed.

From the gap sensor 13 for detecting the distance between the workpiece 14 and the nozzle tip 12, which is attached to the laser processing head 10, the distance between the workpiece 14 and the nozzle tip 12 is detected. When the detected distance and a set reference distance are compared and the detected distance is smaller than the set value, it is determined that the nozzle tip 12 is at an approach side.

When it is determined that the nozzle tip 12 is close to the workpiece 14 and is at the approach side, a gap control gain G' ($\Delta E$) in accordance with a preset displacement amount $\Delta E$ for the approach side (a function in accordance with the displacement amount) and a gap control gain G" for abnormal closeness in accordance with an abnormally close distance are used to change from a normal gap control gain G to the gap control gain G' ($\Delta E$) obtained from a gap control gain function in accordance with the displacement amount ($\Delta E$) for the approach side. With this, a gap control axis following speed is increased, whereby collision is avoided. Furthermore, when an emergent abnormal closeness is detected, the gap control gain is changed to the gap control gain G" for abnormal closeness (fixed value) to further increase the gap control axis following speed, whereby collision is avoided. Thereafter, when the distance between the workpiece 14 and the nozzle tip 12 is returned to the reference distance, the gap control gain is changed to the (normal) gap control gain G again. According to the present invention, processing interruption due to interference can be eliminated and a feed speed can be set independently from the gap control axis following speed.

In the technique disclosed in Japan Patent Application Laid-Open No. 2003-236691 described above, a gap control gain is increased and decreased during laser processing (during cutting processing), which also makes the technique different from that in the present embodiment.

Embodiment 1

Figure 2C:
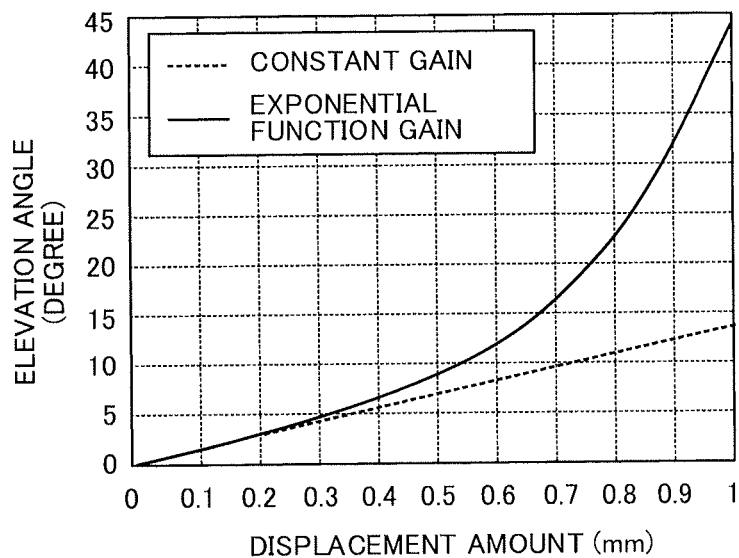
Figure 2D:
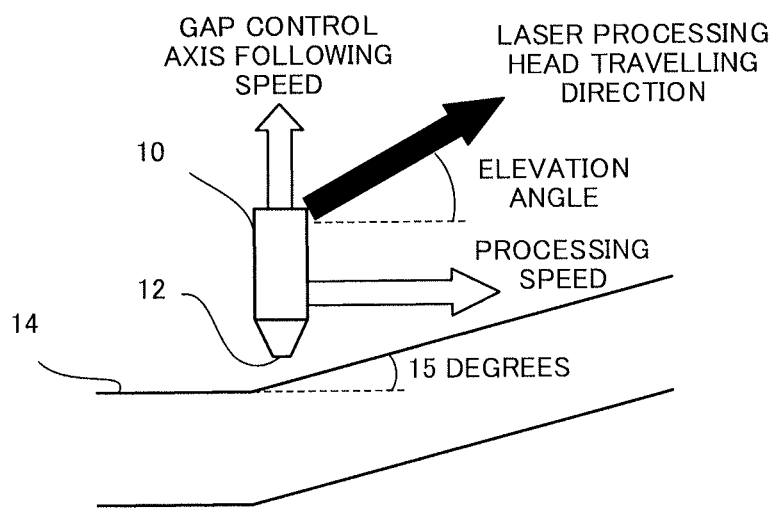

FIGS. 2A to 2D are diagrams explaining Embodiment 1 according to the present invention. As illustrated in FIG. 2D, from a sensor (not illustrated) for detecting the distance between a workpiece 14 and a nozzle tip 12, which is attached to a laser processing head 10, the distance between the workpiece 14 and the nozzle tip 12 is detected. When the detected distance and a set reference distance (reference displacement amount) are compared and the detected distance is smaller than the set value, it is determined that the nozzle tip 12 is at an approach side.

When it is determined that the nozzle tip 12 is at the approach side, an exponential function $g^{\Delta E}+(G-1)$ is applied to a gap control gain function in accordance with a displacement amount $\Delta E$ for the approach side. It should be noted that g is a bottom of a gap control gain exponential function, ΔE is a displacement amount, and G is a (normal) gap control gain.

A case is assumed in which the laser processing head 10 has reached a unit of the workpiece 14 where a bend due to a "curve" of 15 degrees is present, and advantages in comparison with a conventional technique will be described. In this case, the gap control gain function described above is applied and processing is performed while the distance between the nozzle tip 12 and the workpiece 14 is maintained at 1 mm (reference distance). Furthermore, the conditions described below are set in this case. The bottom g of the gap control gain exponential function is 120, the (normal) gap control gain G is 40 (1/sec), and the processing speed is 10,000 (mm/min).

As illustrated in FIG. 2A, the gain G is continuously changed in accordance with the displacement amount ΔE. The gain G in this case is an exponential function that is monotonously increased as ΔE is increased, that is, as the nozzle tip 12 approaches the workpiece 14. In accordance with the change of this gain G, as the gap control following speed changes as in FIG. 2B and the displacement amount ΔE is increased (that is, the nozzle tip 12 approaches the workpiece 14), a gap control axis is operated faster than that with a conventional technique, in which the gain is constant.

Whether or not the nozzle tip 12 collides with the workpiece 14 can be checked by checking whether the elevation angle in the travelling direction of the laser processing head 10 which is determined by the relation between the processing speed and the gap control axis following speed illustrated in FIG. 2D can be larger than the bend due to the "curve" of the workpiece 14.

FIG. 2C illustrates the relation between the displacement amount ΔE and the elevation angle. In the case of the conventional technique in which the gain is constant, even when the displacement amount ΔE is large, the elevation angle is smaller than the bend due to the "curve" of 15 degrees of the workpiece 14. However, with the gain using the exponential function, when the displacement amount ΔE exceeds 0.7 mm, the elevation angle exceeds 15 degrees, whereby collision between the nozzle tip 12 and the workpiece 14 can be avoided.

After collision is avoided, the distance between the workpiece 14 and the nozzle tip 12 (displacement amount ΔE) detected from the sensor is returned to the set reference distance (reference displacement amount), and the gain is changed to the normal gap control gain again.

The gap control gain for the approach side is a function G(x) that is any one of an N-order function (N is a natural number), a trigonometric function, an exponential function, and a logarithmic function and is continuous at the approach side from the reference position corresponding to the reference distance.

Embodiment 2

Figure 3A:
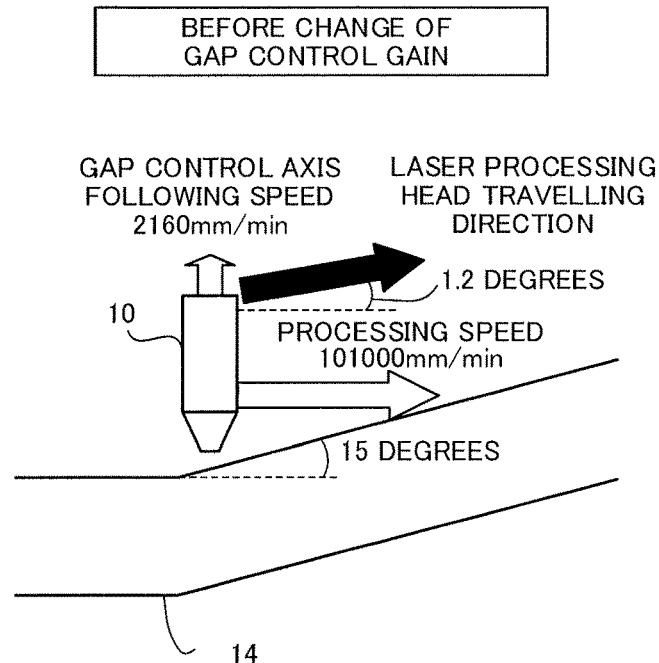
FIGS. 3A and 3B are diagrams explaining Embodiment 2 according to the present invention.
Figure 3B:
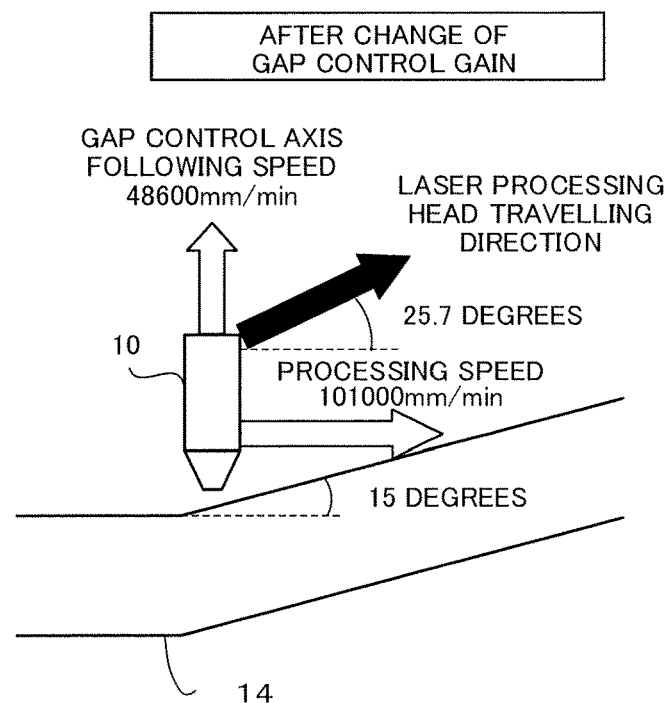

FIGS. 3A and 3B are diagrams explaining Embodiment 2. FIG. 3A illustrates a state before the change of the gap control gain and FIG. 3B illustrates a state after the change of the gap control gain. A case is assumed in which the laser processing head 10 has reached a unit of the workpiece 14 where a bend due to a "curve" of 15 degrees is present when processing is performed while the distance between the nozzle tip 12 and the workpiece 14 is maintained at 1 mm. During the processing, from a sensor (not illustrated) for detecting the distance between the workpiece 14 and the nozzle tip 12, which is attached to the laser processing head 10, the distance between the workpiece 14 and the nozzle tip 12 is detected. In this case, an abnormally close distance is reached in a very short time.

Furthermore, the conditions described below are set in this case. The (normal) gap control gain is 40 (1/sec), the processing speed is 101,000 (mm/min), the abnormally close distance is 0.1 (mm), and the gap control gain for abnormal closeness is 900 (1/sec).

In the case of this processing, the time elapsed from when the laser processing head 10 reaches the starting point of the bend due to the "curve" of the workpiece 14 to when abnormally close distance is caused is 2 msec, which is very short. This is an emergent abnormally close distance, and the gap control gain is thus changed to the gap control gain G" for abnormal closeness (fixed value).

The gap control axis following speed before the change of the gap control gain is 60×40 (1/sec)×[1.0 (mm)−0.1 (mm)]=2,160 mm/min. Because the processing speed is 101,000 mm/min, the travelling direction of the laser processing head 10 proceeds in the direction of 1.2 degrees against the horizontal direction.

When the gap control gain is changed to the gap control gain G" for abnormal closeness (fixed value), the gap control axis following speed is 60×900 (1/sec)×[1.0 (mm)−0.1 (mm)]=48,600 mm/min. Because the processing speed is 101,000 mm/min, the travelling direction of the laser processing head 10 proceeds in the direction of 25.7 degrees against the horizontal direction. Because the "curve" of the workpiece 14 is 15 degrees, processing can be performed while collision is avoided.

After collision is avoided, the distance between the workpiece and the nozzle tip detected from the sensor is returned to the set reference distance, and the gain is changed to the (normal) gap control gain again.

Figure 4A:
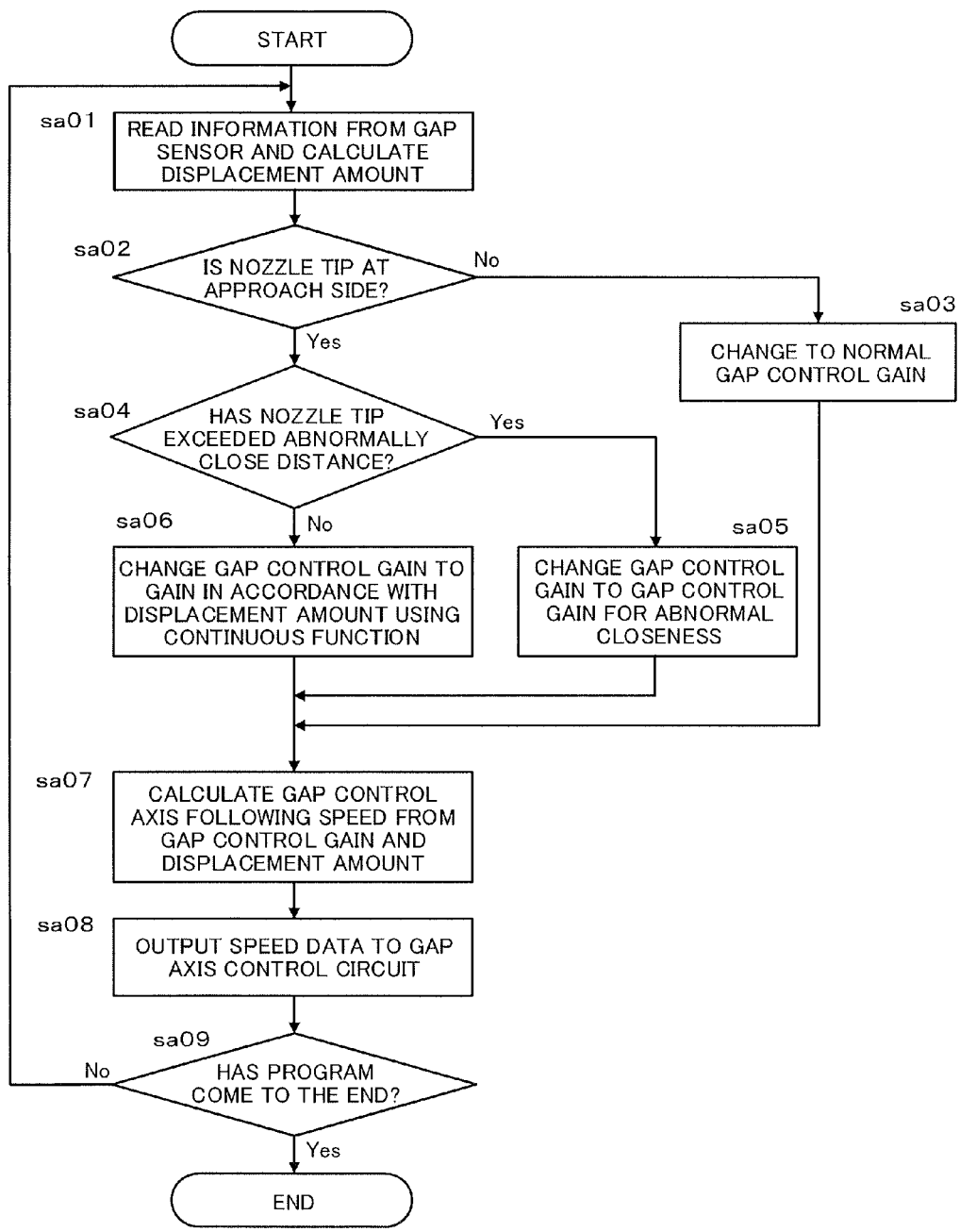
FIG. 4A is a flowchart showing interference avoidance processing under gap control according to one embodiment of the present invention.

FIG. 4A is a flowchart showing interference avoidance processing under gap control according to the present invention. The processing will be described below step by step.

[Step sa01] Information from the gap sensor is read and the displacement amount is calculated.

[Step sa02] A determination is made whether or not the nozzle tip is at the approach side. If the nozzle tip is at the approach side (Yes), the processing proceeds to Step sa04. If the nozzle tip is not at the approach side (No), the processing proceeds to Step sa03.

[Step sa03] The gap control gain is changed to the normal gap control gain, and the processing proceeds to Step sa07.

[Step sa04] A determination is made whether or not the nozzle tip has exceeded the abnormally close distance. If the nozzle tip has exceeded the abnormally close distance (Yes), the processing proceeds to Step sa05. If the nozzle tip has not exceeded the abnormally close distance (No), the processing proceeds to Step sa06.

[Step sa05] The gap control gain is changed to the gap control gain for abnormal closeness, and the processing proceeds to Step sa07.

[Step sa06] The gap control gain is changed to a gain in accordance with the displacement amount using a continuous function.

[Step sa07] The gap control axis following speed is calculated from the gap control gain and the displacement amount.

[Step sa08] Speed data is output to a gap axis control circuit.

[Step sa09] A determination is made whether or not the program has come to the end. If the program has not come to the end (No), the processing proceeds to Step sa01. If the program has come to the end (Yes), the processing is completed.

Figure 4B:
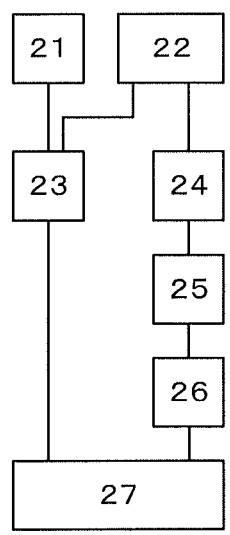
FIG. 4B is a diagram explaining a numerical controller according to one embodiment of the present invention.

FIG. 4B explains a numerical controller according to one embodiment of the present invention.

The numerical controller includes, a displacement amount calculating unit 23 configured to detect the separation distance connected to a reference distance specifying unit 21 configured to specify the reference separation distance and a gap amount detecting unit 22 as the gap sensor 13, a first determining unit 24 connected to the gap amount detecting unit 22, a first changing unit 25 configured to change the gap control gain continuously in accordance with the displacement amount and connected to the first determining unit 24, a data storing unit 26 storing the gap control gain and connected to the first changing unit 25, a gap control axis following speed calculating unit 27 configured to calculate a gap control axis following speed and connected to the displacement amount calculating unit 23 and the data storing unit 26.

Figure 4C:
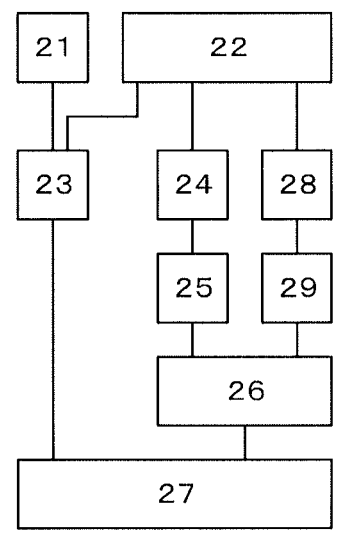
FIG. 4C is a diagram explaining a numerical controller according to another embodiment of the present invention.
Figure 5:
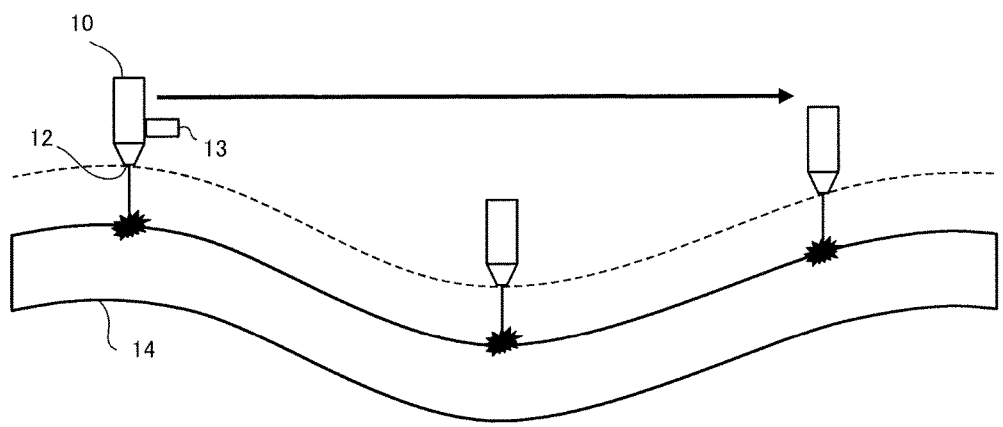
FIG. 5 is a diagram explaining a conventional laser processing method.
Figure 6:
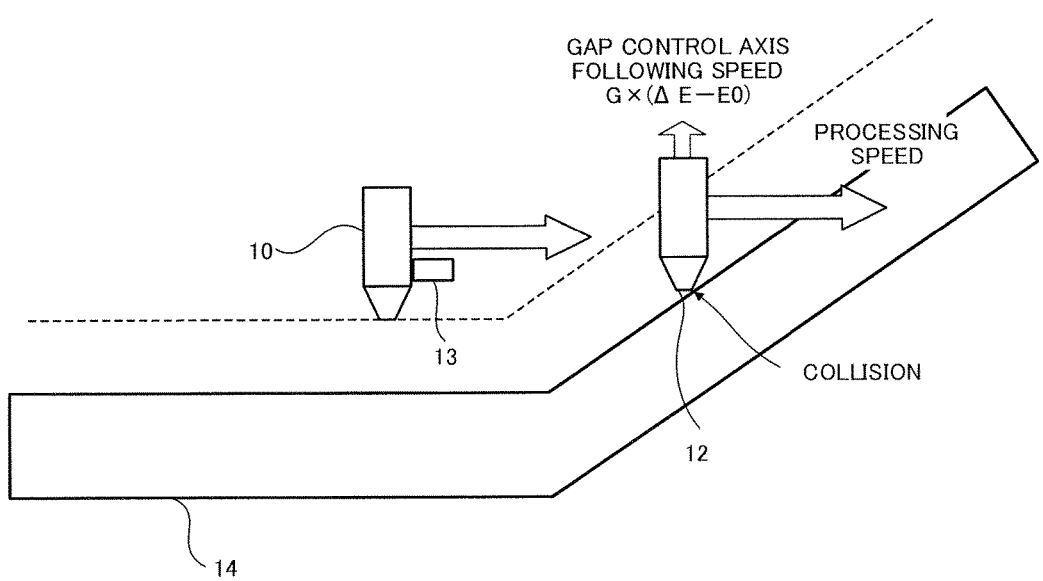
FIG. 6 is a diagram explaining a problem with the conventional laser processing method.

FIG. 4C explains a numerical controller according to another embodiment of the present invention.

The numerical controller may include, a second determining unit 28 connected to the gap amount detecting unit 22, a second changing unit 29 configured to change a gain using a function that is continuous at the approach side closer to the workpiece than the reference position to a gap control gain for emergency after the second determining unit 28 determines that the emergent abnormal closeness is present, and the second changing unit 29 may be connected to the second determining unit 28 and the data storing unit 26.

Some or all of the displacement amount calculating unit 23, the first determining unit 24, the first changing unit 25, the data storing unit 26, the gap control axis following speed calculating unit 27, the second determining unit 28, and the second changing unit 29 may be configured as a single CPU.

The invention claimed is:

1. A numerical controller controlling a laser processing machine, the numerical controller including a processor configured to perform a method comprising:
    specifying a reference separation distance between a nozzle tip and a workpiece as a reference distance;
    detecting a separation distance between the nozzle tip and the workpiece;
    obtaining a displacement amount from the specified reference distance and the detected separation distance;
    calculating a gap control axis following speed based on the obtained displacement amount and a stored gap control gain G;
    determining that the nozzle tip has entered an approach side when the detected separation distance between the nozzle tip and the workpiece becomes smaller than the specified reference distance;
    changing the gap control gain G using a function G(x) continuous at the approach side closer to the workpiece than the specified reference position to an approach side gap control gain G' continuously and increasingly in accordance with the obtained displacement amount when the nozzle tip is determined to have entered the approach side;
    controlling a position of the nozzle tip of the laser processing machine based on the obtained displacement amount; and
    determining that emergent abnormal closeness is present when the detected separation distance between the nozzle tip and the workpiece becomes smaller than a predetermined abnormally close distance;
    changing the approach side gap control gain G' to a fixed-value gap control gain G" for emergency when the emergent abnormal closeness is present to return the nozzle tip to the specified reference position, the fixed-value gap control gain G" being higher than the approach side gap control gain G';
    determining that the nozzle tip has returned from the approach side to the specified reference position after changing the approach side gap control gain G' to the fixed-value gap control gain G"; and
    switching to a normal gap control gain when the nozzle tip is determined to have returned to the specified reference position.

2. The numerical controller controlling a laser processing machine according to claim 1, wherein the gap control gain for the approach side is a function that is any one of an N-order function with N being a natural number, a trigonometric function, an exponential function, and a logarithmic function and is continuous at the approach side from the specified reference position.

* * * * *